March 8, 1955

R. A. BOBO 2,703,532

ELECTROMECHANICAL GAS LIFT VALVE AND CONTROL SYSTEM THEREFOR

Filed Feb. 23, 1949

Inventor.
Roy A. Bobo
by Darby & Darby
Attorneys

March 8, 1955

R. A. BOBO 2,703,532

ELECTROMECHANICAL GAS LIFT VALVE
AND CONTROL SYSTEM THEREFOR

Filed Feb. 23, 1949

Inventor:
Roy A. Bobo
by Darby & Darby
Attorneys

Inventor:
Roy A. Bobo
by Darby & Darby
Attorneys,

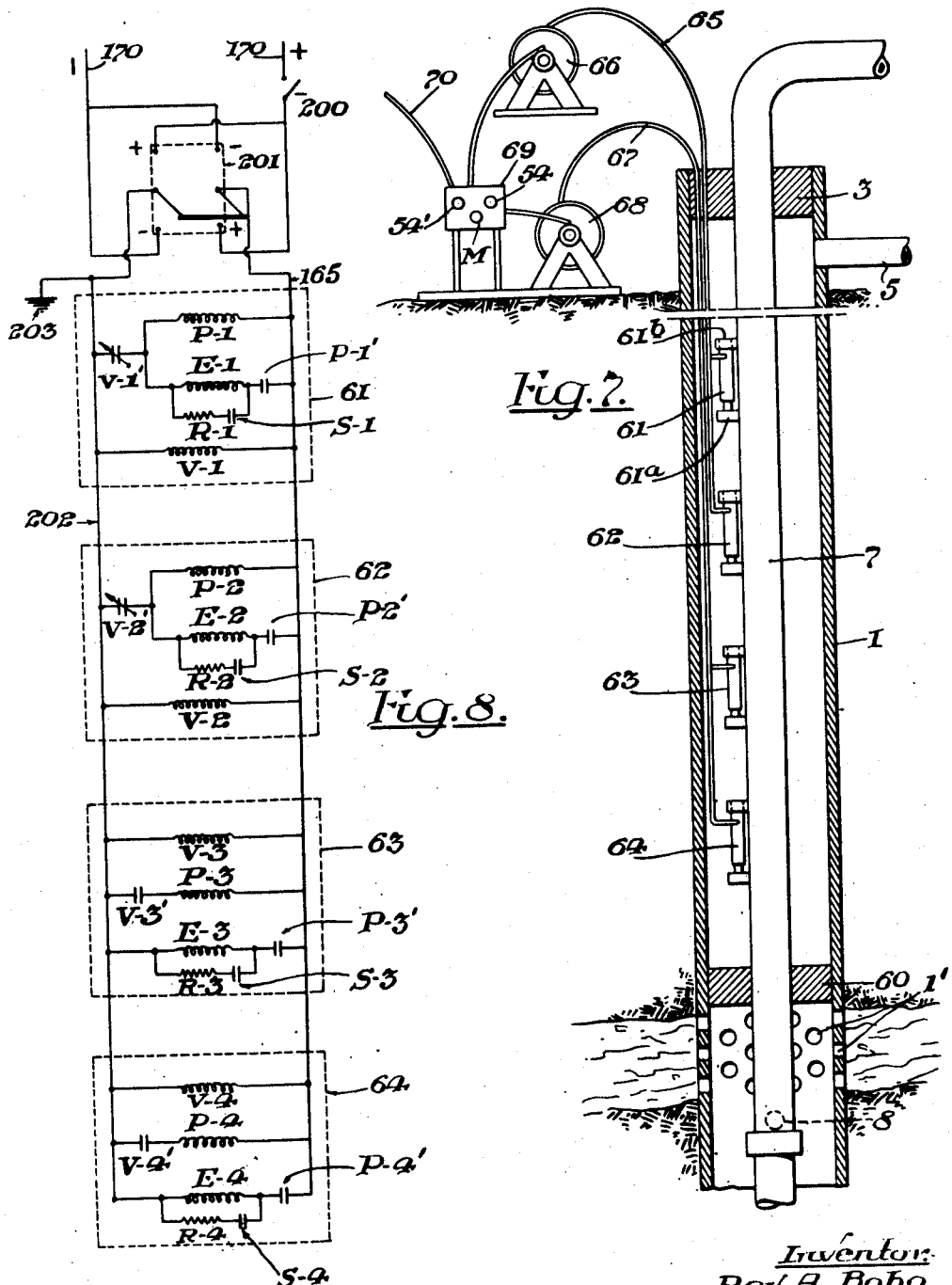

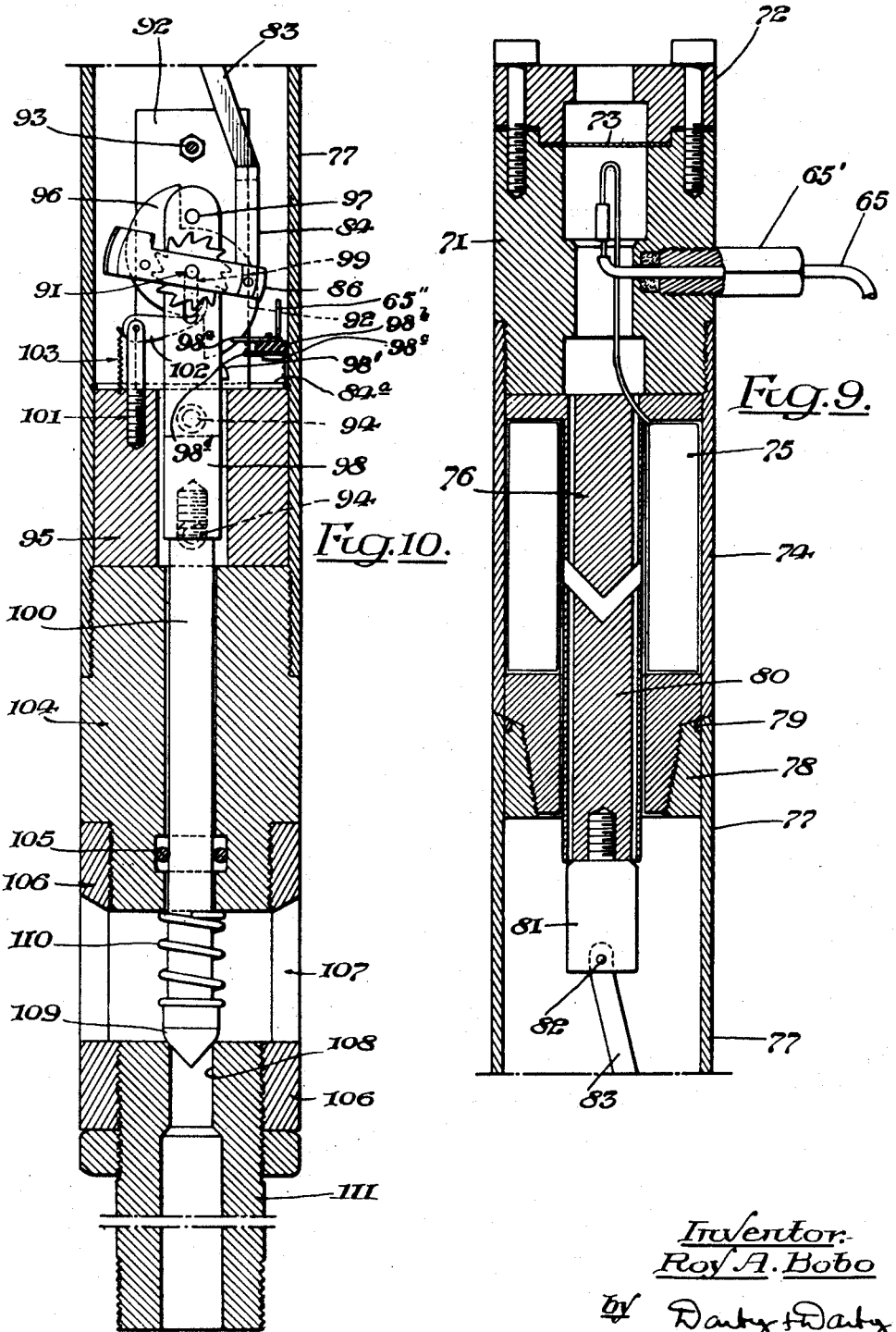

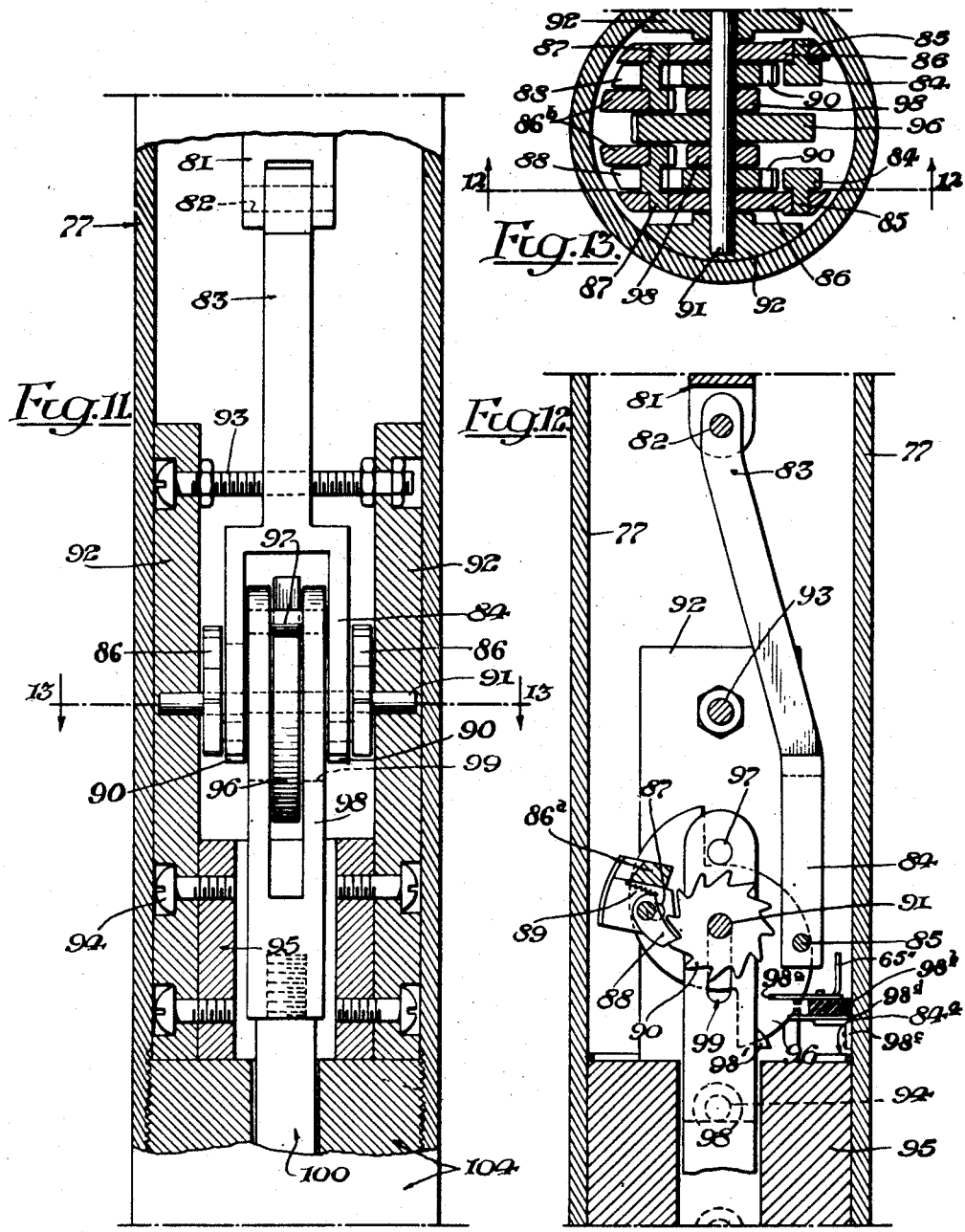

United States Patent Office 2,703,532
Patented Mar. 8, 1955

2,703,532

ELECTROMECHANICAL GAS LIFT VALVE AND CONTROL SYSTEM THEREFOR

Roy Alexander Bobo, Houston, Tex., assignor to Phillips Petroleum Company, a corporation of Delaware Application February 23, 1949, Serial No. 77,752

18 Claims. (Cl. 103—233)

This invention is concerned with electro-mechanical gas lift devices that can be controlled positively from the surface.

A broad object of this invention is to provide an apparatus of such versatility as to permit its adaptation to the entire range of gas lift operations in producing an oil well.

A subsidiary object is to provide a system of this type adapted to continually flow a well in such a manner as to eliminate a substantial percentage of energy loss such as occurs through the use of the best continuous flow valves now available.

Another subsidiary object of the invention is to provide a system of this type adapted for intermittent flow wherein operation is independent of pressure and permits of the use of the minimum injection gas pressures for producing deep wells.

An object of this invention is to provide means controllable from the surface for admitting gas at a prescribed point or points to the producing string of an oil and gas or a water well through an orifice the opening of which can also be regulated from the surface in order to lift or assist in lifting fluid from the well.

A further object of the invention is to provide a system of this type in which two or more down-hole electrical mechanisms may be controlled from the surface in an oil and gas or water well by means of the tubing and one insulated conductor.

Still another object of the invention is to provide a system of this type in which four or more down-hole electrical mechanisms are controlled from the surface in an oil and gas or water well by means of the tubing and one insulated conductor.

Still another object of the invention is to provide a signal device as a part of such systems whereby there is given at the surface a positive indication that the desired electro-mechanical gas lift valve has been placed in a known position.

Still another object is to provide a gas lift system in which a plurality of down-hole electro-mechanical gas lift mechanisms may be controlled selectively from the surface.

Still another object is to provide in a gas lift system means within the electro-mechanical mechanisms whereby the valve may be opened to any desired amount.

A more general object of the invention is to provide a gas lift mechanism for controlling the flow of wells and capable of extending the range of gas lift application from either water drive or gas drive reservoirs, whereby the same equipment can be used for all productive stages in a well's life.

Other and more detailed objects of the invention will be apparent from the following disclosure and the several embodiments of the invention illustrated in the attached drawings.

In the accompanying drawings,

Figure 1 is a diagrammatic view showing an oil well and its casing in vertical section of a system in accordance with this invention;

Figures 2 and 3 together disclose the details of construction of a down-hole implement utilizing a gas displacement chamber for effecting fluid lift in accordance with the principles of this invention;

Figure 7 is a diagrammatic and schematic illustration showing an oil well and its casing in vertical section of a system in accordance with this invention for effecting intermittent flow;

Figure 8 is a diagrammatic and schematic illustration of a modified circuit for positively and selectively controlling four down-hole gas lift valves from the surface employing a single conductor and a ground connection to the tubing;

Figure 1:
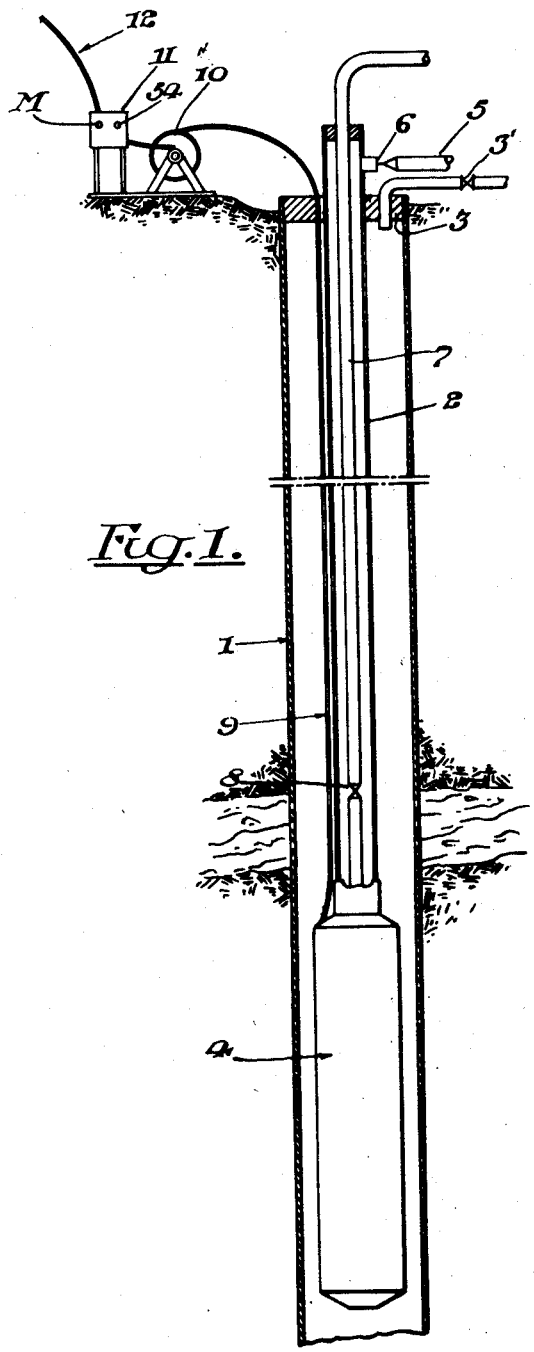

Figures 9 and 10 together show a modified form of the electro-mechanical gas lift valve which may be employed with the systems herein disclosed;

Figure 11 is a detailed cross-sectional view of a part of the mechanism of Figure 10 taken on a plane at right angles to the section of Figure 10;

Figure 12 is a cross-sectional view taken on the line 12—12 of Figure 13; and

Figure 13 is a cross-sectional view taken on the line 13—13 of Figure 10.

The trend for producing deep wells has been and continues to be toward the use of gas lift devices. As a general rule, these wells are in water driven reservoirs and have high fluid levels which means that large volumes of water must be produced along with the oil. The fluid from these wells also contains large quantities of suspended sand. It can be readily seen that to produce a large quantity of fluid with sucker rod pumps, the pumps must be actuated very rapidly. This rapid movement, and the suspended sand acting as an abrasive, increases the wear on the moving parts to such an extent that, in many cases, it is uneconomical to produce the well with a sucker rod pump. Many types of gas lift devices have been and are now being used to produce such wells. In most instances, these gas lift devices cannot be positively controlled from the surface, and as a result, their efficiency is low. Some of the present types of gas lift devices are actuated from the surface of the ground and have been erroneously referred to as surface controlled gas lift devices. These lift devices are not surface controlled devices but rather surface actuated devices, since the size of the valve opening in such devices cannot be changed without moving the entire apparatus from the well. It is the purpose of this invention to disclose improved systems and apparatus for the gas lifting of fluid from wells in which the size of valve opening, and the time of opening or closing of such valves may be positively controlled from the surface by the manipulation of a simple control device. Moreover, the equipment has been so devised that it may be adapted with equal efficiency to displacement pumping or to intermittent or continuous gas lift operations.

The apparatus of Figures 1 to 6 inclusive discloses a system suitable to produce wells of low fluid level by means of a two-string gas displacement lift in order to keep the pressure off the formation. This system discloses how two valves may be used to accomplish this result employing only one insulated external conductor with the other circuit leg being the tubing. Such a system is diagrammatically illustrated in Figure 1. The well bore is lined with the usual casing 1 which is sealed at the top in any suitable manner, as diagrammatically illustrated at 3. The casing is usually vented through valve and line 3' to prevent excessive build up of pressure on the formation. Extending downwardly into the casing is the regular tubing string 2, the lower end of which is attached to the gas displacement chamber diagrammatically illustrated at 4. The regular tubing string 2 is suspended and sealed at the top, as diagrammatically illustrated, and is provided with a gas injection line 5 containing a choke 6 diagrammatically illustrated, which may be of any suitable type available and preferably adjustable. Extending axially and within the regular tubing is a smaller tubing 7 sometimes called the macaroni string, which is provided with a check valve 8 diagrammatically illustrated. Check valve 8 may be located anywhere within tubing 7 or its lower extension (tail pipe 33, Fig. 3). One insulated control conductor 9 is diagrammatically shown extending upwardly from the down-hole equipment to a take-up and supply reel 10, and from there to the control and indicating board 11 to which power is supplied from any suitable source through the conductor 12. As will be further explained, the other conductor of the circuit is the tubing.

Figure 2:
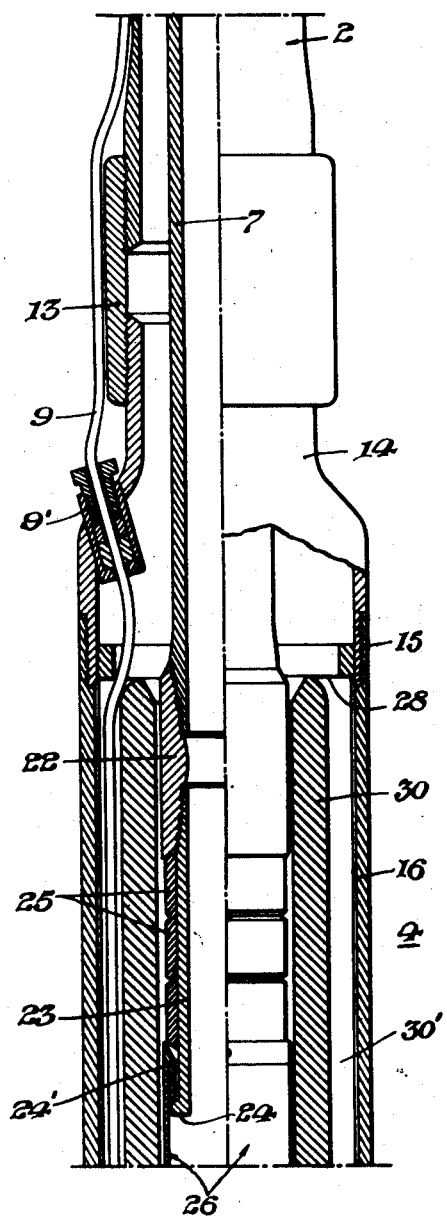

The gas displacement chamber 4 is attached to the regular tubing string 2 by means of a coupling 13, as clearly shown in Figure 2 which threadedly engages a cap member 14 forming a part of the chamber. This cap member is threadedly connected at 15 to a tubular housing 16 closed at the lower end by threaded connection to the fixture 17 to which in turn is threadedly attached the tubular housing 18, the end of which is in the form of a cap, as clearly shown in Figure 3. The lower end of the cap 18 has a fluid inlet port 19 which is closed by a standing valve ball 20 trapped within cage 21 in accordance with the common form of structure for valves of this type. The length of tubular housing 18 is dependent upon the volume of fluid to be lifted each cycle.

The macaroni tubing 7 is threadedly connected by means of a sleeve 22 (see Fig. 2) to an inner tubular extension 23 formed with a flange at its lower end 24 upon which a threaded sleeve 24' rests. A further tubular extension 26 is threadedly attached to the collar 24' and is provided with a threadedly attached sealing member 27 at its lower end (see Fig. 3) having a conical seating face in which a sealing gasket 32 of suitable material is recessed. A series of packing rings 25 surround the tubular extension 23 (see Fig. 2) which will expand outwardly between the lower end of the coupling sleeve 22 and the upper end of threaded sleeve 24', if macaroni tubing 7 is lowered from its position shown in Fig. 2.

Figure 3:
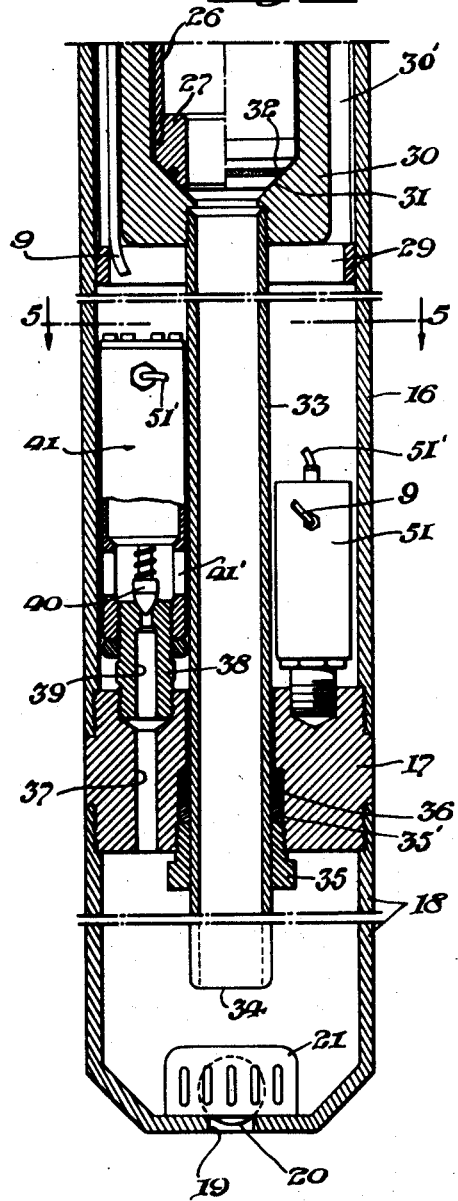

Attached in the lower end of the cap 14 near its free peripheral end is the upper retainer ring 28 which is secured therein in any suitable manner, as for example by welding. A similar retainer ring 29 is welded in spaced relation to the inner wall of the housing 16 (see Fig. 3.) Extending between the retainer rings 28 and 29 is a tubular casing 30 which is clamped between the retainer rings when the housing 16 is screwed up tight on the cap 14, as is clear from Figs. 2 and 3. The external diameter of the tubular housing 30 which is somewhat less than the internal diameter of the housing 16 has a number of longitudinal grooves 30' to provide passageways for gas as well as conductor 9. The inner lower end of the housing 30, as is clear from Fig. 3, is provided with a conical seat 31 for cooperation with the sealing number 27. The lower ported end of the housing 30 has threadedly attached thereto tail pipe 33 which extends through the fixture 17 in fluidtight relation therewith by reason of the packing gland nut 35, follower 35' and the packing 36. The lower open end 34 of the tube 33 extends into the chamber formed by the tubular housing 18 to a point quite close to cage 21.

Fixture 17 has a longitudinal port 37 extending therethrough and including at its upper end an enlarged threaded receptacle for the valve supporting nipple 38 which is mounted therein. This nipple has a passage 39 therethrough terminating in a valve seat in its upper end. Mounted on nipple 38 is an electromagnet valve operator 41 which controls the valve member 40 in its cooperation with the valve seat of nipple 38. The electromagnet valve operator 41 is shown in full detail in Fig. 9.

As illustrated in Figure 3 the valve 40 is spring biased to the closed position in which it is shown. As indicated in Fig. 3 the housing extension of the electromagnet valve operator 41 by means of which it is attached to the nipple 38 is provided with a series of apertures 41'.

Figure 4:
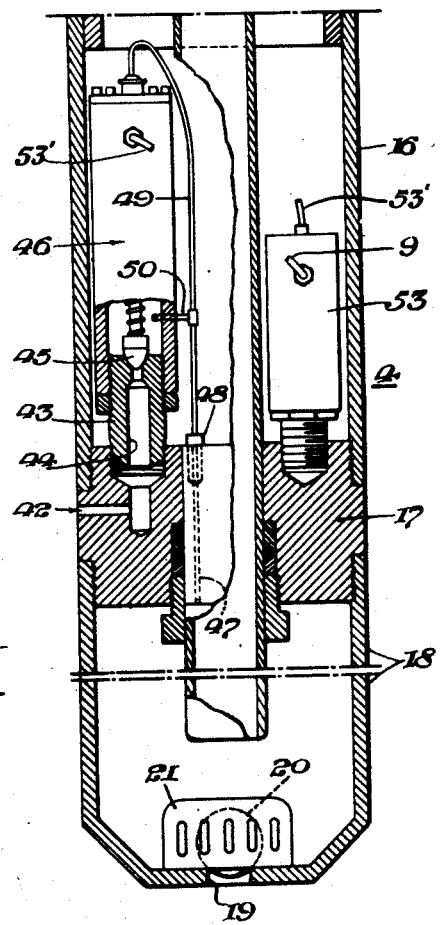
Figure 4 is a view comparable to that of Figure 3 but showing the parts in cross-section on a plane at right angles to the plane on which the section of Figure 3 is taken.

In the plane at right angles to that of Fig. 3, namely that shown in Fig. 4, the fixture 17 has a right angle passage 42 venting exteriorly of the gas displacement chamber and having a terminal threaded enlargement in which the nipple 43 is mounted. This nipple has a passage 44 terminating in a seat at its upper end with which the spring biased valve 45 cooperates. This valve too is actuated by means of an electromagnet valve operator 46. The electromagnet valve operator 46 can also be like that shown in Fig. 9, but it will be noted, as indicated in Fig. 4, that the housing extension thereof by means of which it is mounted on the nipple 43 is imperforate as distinguished from electromagnet valve operator 41. The fixture 17 has a small longitudinal passage 47 therethrough to which is attached, by means of a coupling member 48, a tube 49 which extends to the top of the housing of electromagnet valve operator 46 as shown and has a branch 50 opening into the space in which the valve 45 operates.

At 51 in Fig. 3 is diagrammatically illustrated any suitable form of electric current rectifier, such as for example the well known copper oxide rectifier, and similarly at 53 in Fig. 4 there is diagrammatically illustrated another such rectifier. The housings for these rectifiers are provided with threaded extensions by means of which they are mounted in the fixture 17, as illustrated.

Figure 5:
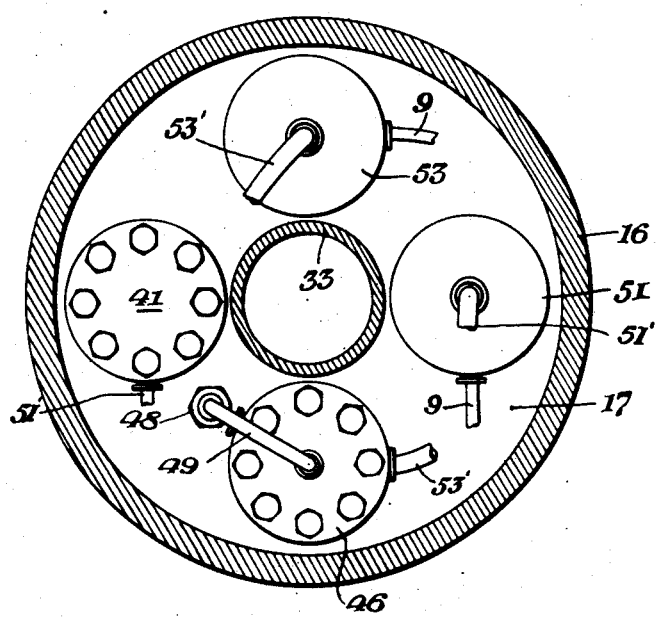
Figure 5 is a cross-sectional view taken on the line 5—5 of Figure 3.

The spatial distribution of the electromagnet valve operators 41 and 46 and the rectifiers 51 and 53 is clearly illustrated in Fig. 5. They are all mounted within the housing 16 and are circumferentially distributed around the inner tube 33, as will be clear from Fig. 5.

Figure 6:
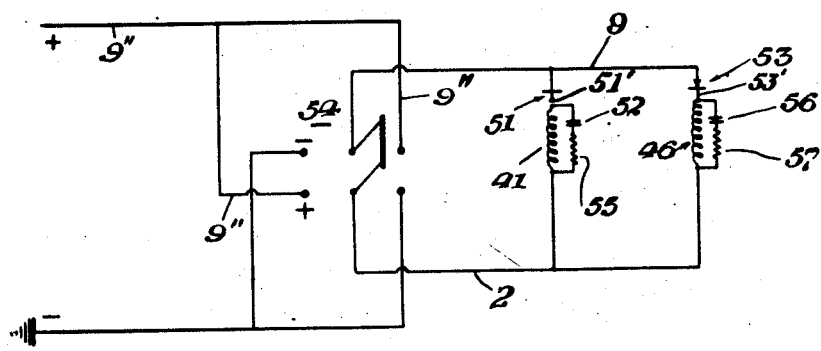
Figure 6 is a diagrammatic and schematic illustration of a control circuit and mechanism for positively and selectively controlling two down-hole gas lift valves by means of a single conductor and a ground on the tubing.

Fig. 6 diagrammatically illustrates a single conductor circuit by means of which the magnet valves can be alternately operated from the surface to provide positive and selective control action therefor. Conductor 9 extends from the control and indicating board 11 to the down-hole equipment along the outside of the regular tubing 2 (see Fig. 1) and enters the housing of the gas displacement chamber through a suitable fluidtight packing gland seal 9' (see Fig. 2), to the rectifiers 51 and 53 located within housing 16 (see Fig. 5). A source of direct current through conductors 9'' is connected to a diagonally arranged pair of contacts of a double pole double throw switch 54. The other diagonal pair are connected to ground. One of the movable blades of switch 54 is connected by the conductor 9 and thence to one terminal of each of the rectifiers 51 and 53 as mentioned above. These rectifiers are arranged for current flow in opposite directions as diagrammatically illustrated. The other terminal of rectifier 51 is connected by wire 51' to one terminal of the operating winding for the electromagnet valve operator 41, the other terminal of the electromagnet valve operator 41 is connected to the other blade of the switch through tubing 2 which serves as a conductor. Similarly the other terminal of rectifier 53 is connected by wire 53' to one terminal of the operating winding of electromagnet valve operator 46 and the other terminal of the electromagnet valve operator is connected to the other blade of the switch, through tubing 2 which serves as a conductor. A parallel circuit around the winding of electromagnet valve operator 41 includes a normally open switch 52 and a resistor 55, and similarly the winding of electromagnet valve operator 46 is connected in parallel with the resistor 57 through the normally open contacts 56. Switches 52 and 56 are normally open single pole single throw switches arranged to be actuated by the stems of the valves 40 and 45 respectively by means of any suitable structure, an example of which will be described in connection with Fig. 9.

A description of the construction and operation of the electromechanical lift valve, shown in Figs. 9 and 10 when taken together, will be helpful before describing the operation of the system of Figs. 1 to 7. It includes a body member 71 having an apertured cap 72 detachably secured thereto by means of bolts. A flexible impervious diaphragm 73 is secured in sealing relation between the members 71 and 72. It will be assumed that the valve of Figs. 9 and 10 is the valve 61 of Fig. 7, although it is to be understood that it is representative of all of the valves 61 to 64 inclusive of that figure, and electromagnet valve operator 41 of Fig. 3. It should also be understood that electromagnet valve operator 46, shown in Fig. 3, is similar to these valves. The only difference being that sleeve 106 is imperforate save for a tube inlet 50 (Fig. 4) and that since it operates on the reduced pressure in chamber 4 the magnet valve through diaphragm 73 should be balanced against the lower pressure so that tube 49 fits tightly in the aperture of cap 72. This is readily understandable since the magnet valve will work best if pressures are equalized. The conductor 65 extends into the chamber within the body member 71 through a fluidtight seal or bushing 65'. Threadedly secured to the body member 71 is a tubular housing 74 of magnetic material. Mounted in the housing 74 is a magnetic pole piece 76 constructed to provide a central core for a solenoid winding 75, one terminal of which is connected to the conductor 65 as shown. The other terminal of the winding is grounded on the housing 74. An extension of magnetic housing 74 comprises a tubing 77 of non-magnetic material, preferably metal, which is threadedly secured to the housing 74 by means of internally threaded annular ring 78 secured in the end of the extension 77. A lead gasket 79 is provided to insure a fluidtight seal at this joint. Slidably mounted through the threaded boss at the lower end of the magnetic housing 74 is magnetizible solenoid plunger 80 to the lower end of which is detachably secured a fixture 81 to which is pivotally attached at 82 the lever 83.

Referring to Fig. 10, the lower end of the link 83 is provided with a yoke end 84 the shape of which is clearly shown in Fig. 11. The arms of this yoke are provided, as is indicated in Figs. 12 and 13 with axially aligned pivot extensions 85 which pivotally engage a pair of levers 86 which in turn are pivotally mounted on a fixed pivot pin 91. The opposite ends of the levers 86 are bifurcated, and for purposes of clarification the horizontal parts are called 86ᵃ and the second vertical prong 86ᵇ. Pivotally mounted therein by means of the pivot pins 87 are the pawls 88. These pawls are mounted on the pivot pins 87 in an off center relation so as to give them the desired swinging movement for actuating the ratchet wheels 90 with which they cooperate. The pawls are biased by means of the springs 89 into engaging direction with respect to the ratchet wheels. The ratchet wheels 90 are secured to the pivot pin 91, as is the centrally located cam 96. The levers 86 are mounted for free rotation on the pivot pin 91. The pivot pin is secured in a pair of bearing members 92 which are diametrically aligned and held in proper spaced relation at their upper ends by means of a bolt 93 and cooperating nuts, as clearly shown in Fig. 11. The lower ends of the bearing members 92 fit in longitudinal grooves in the surface of the cylindrical sleeve 95 in which they are secured by means of the machine screws 94 (see Fig. 11). The sleeve member 95 is held by snap ring 84ᵃ nesting in the housing extension 77 and on the seat provided by fixture 104 which is threadedly mounted in the end of this housing 77, as shown in Fig. 10. A fixture 98 attached to the upper end of a valve stem 100 is slotted at its upper end so as to lie on opposite sides of the cam 96. The arms formed by slotting the end of the fixture 98 are provided with elongated slots 99 to permit reciprocation of the fixture without interference with the pivot pin 91. A cam follower pin 97 extends between these arms and cooperates with the cam 96. Mounted in the sleeve 95 is a pivot standard 101 on which is pivotally mounted a detent pawl which is held against the sprocket as shown in Figure 10 under the influence of the tension spring 103. The fixture 98 has a radial extension 98' positioned to engage a resilient contact finger 98ᵃ which is mounted upon an insulating support 98ᵇ, which in turn is supported by a bracket 98ᶜ grounded on the housing extension 77 as is a fixed contact 98ᵈ. This switch corresponds to either of the switches 52 and 56 previously mentioned in connection with Fig. 6, the operation of which will be described upon completion of the description of the parts of the electro-mechanical valve.

The valve stem 100 extends through an O seal ring packing 105 to a point exteriorly of the fixture 104. It is provided at its lower end with a valve member 109 and is biased by means of a compression spring 110 into seating engagement with a seat formed on the coupling nipple 111 which has a passage 108 therethrough. This nipple is threadedly mounted in the lower end of a sleeve 106 which is threadedly secured to the lower end of fixture 104. This fixture is tubular in form and is provided with a series of longitudinal ports 107 in its peripheral wall, as shown. The entire void space between diaphragm 73 and O ring 105 is preferably filled with a moisture-free oil.

It will be seen that each time the circuit to the winding 75 is completed the plunger 80 (Fig. 9) will be attracted by the central pole piece 76, with the result that through the link connection 83 the levers 86 will be oscillated in a counterclockwise direction (Fig. 12) so that the spring biased pawls 88 will impart one step of movement to the ratchet wheels 90 and therefore to the pivot pin 91 and the cam 96 attached thereto. Upon de-energization of the winding 75 the solenoid plunger will drop back to the position shown in Fig. 9, but cam 96 and ratchet wheels 90 will be held in place by action of detent pawl 102 against wheel 90. Successive energizations of the winding will cause a step-by-step rotation of cam 96 the radius of which is increasing, with the result that the cam pin 97 which engages it will be gradually raised as will the member 98 to which the valve stem 100 is attached. Thus the valve 109 will be gradually raised from its seat (see Fig. 10) compressing spring 110 and may be moved to any desired position between fully closed and fully opened position. It can be seen that as valve 109 is first lifted by initial movement of cam 96 extension 98' on valve stem 100 in its movement upward may pass resilient finger 98ᵃ without completing the circuit connected thereto. Successive energization of magnet valve 75 will not affect the contacts 98ᵃ and 98ᵈ. However, shortly after pin 97 is raised to its highest point by cam 96 it falls to its lowest point and the valve 109 is returned to its seat by spring 110. During the downward descent of the valve extension 98' will momentarily force switch contact 98ᵃ to engage switch contact 98ᵈ and cause an indicating meter M on the control board 69 to operate and thus indicate at the surface that the valve has been closed. The parts may be relocated in an obvious manner to give the same indication for any point in the valve cycle. It is to be understood that the number of teeth on sprockets 90 may be varied according to the problem at hand.

It will be seen that when the cam 96 has been stepped around to its highest point, the cam follower pin 97 will drop off the cam, with the result that valve 109 will be closed by spring 110 and the cam will have returned to the position shown in Fig. 12. The slots 99 in the arms of the member 98 permit this vertical reciprocatory movement of that member without interference by the pivot 91. Each of the valves 61 to 64 inclusive are like the valves just disclosed and the coupling nipple 111 is mounted in the elbow 61ᵃ so that the passage 108 of the nipple is open to the interior of the tube 7 in each case. The upper end of each of these valves is merely supported by a bracket attached to the tubing such as that shown at 61ᵇ in the case of valve 61. This method of mounting gas lift valves is well known in the art.

It will be understood, as illustrated in Fig. 7, that the valves 61 and 62 are selectively operable by means of the single circuit wire 65 in view of the fact that the other terminals of the windings of these valves are grounded via tubing 7 as previously explained through the manipulation of switch 54 which corresponds to switch 54 of Fig. 6. The description of the operation of the circuit of these valves is identical to the operation of the circuit shown in Fig. 6. Similarly the valves 63 and 64 may be selectively manipulated by means of a similar switch 54' and the single conductor 67. In other words, the system of Figure 7 illustrates two control systems like that of Fig. 6, each independent of the other. Thus by the proper manipulation of switch 54 either of valves 61 and 62 may be operated in exactly the same manner as electromagnet valve operators 41 and 46 of the system previously described, and likewise valves 63 and 64 may be selectively operated by the actuation of switch 54'. Those skilled in the art will readily appreciate how the system may be operated to supplement the flow of a well by intermittent gas lift, and it is thought therefore that no further description of this system will be necessary.

It will be recognized, as previously suggested, that any one of the valves 61 to 64 inclusive may be operated to place the valve system thereof in any position intermediate its fully opened and fully closed position. Therefore, a valve of this type is useful as an electro-mechanical gas lift valve for the entire range of gas lift applications. This includes continuous flow, intermittent flow, and two string gas displacement production, as is well understood in the art.

With this system a high bottom hole pressure well may by the proper manipulation of these valves have gas admitted at various points in the producing string. Once the desired valve is opened all others above it being closed the surface source of electric energy may be withdrawn and is no longer needed. In order to achieve gas entry at the desired depth the upper valves may be throttled to maintain gas pressure in the annulus. When operation through the desired valve is attained, the desired amount of valve opening and minimum pressure drop can be secured. No valve fluttering due to variations in fluid density inside the tubing is possible because the opening of the valve is not influenced by pressure variations.

To place the gas displacement valve into the well, please refer to Fig. 1. Displacement chamber 4, complete with standing valve ball 20, tail pipe 33, electromagnet valve operators 41 and 46, and associated mechanisms, is lowered into the well at the bottom of outer tubing 2. Conductor cable 9, which is firmly attached to displacement chamber 4, unreels from reel 10 and is lowered into the well at the same time. As a general rule, the displacement chamber is lowered so as to place opening 42, Fig. 4, at or slightly above the pumping fluid level in the well. When chamber 4 has been placed at the desired level, tubing 2 is appropriately suspended and sealed, as shown diagrammatically at 3. The macaroni string 7 is next lowered inside outer string 2 until seating nipple 32 touches seat 31. At such time, macaroni string 7 is lowered ever so slightly so that packing 25 may be compressed between threaded sleeve 24' and sleeve 22. This longitudinal compression forces packing 25 outwardly against housing 30 so as to effect an additional seal between the pumped fluid inside macaroni string 7 and the pressure fluid between the macaroni string 7 and outer string 2. Having thus placed the displacement pump in the well, the pump is ready to be operated.

In the operation of this system it will be understood that since the lower end of the gas displacement chamber 4, or at least the chamber formed by housing 18, is below well fluid level, and assuming that both valves 45 and 40 are closed fluid may flow into the chamber formed by fixture 17 and lower housing 18 as well as up into tail pipe 33 and possibly into tubing 7 since the pressure of the fluid against the standing valve ball 20 will force the ball from its seat and allow the fluid to enter through the port 19. The height that the fluid reaches in the chamber is dependent upon the pressure of the gas trapped within the chamber. In order to vent this chamber valve 45 may be opened by actuating electromagnet valve operator 46. This is accomplished by turning switch 54, which is located at the switch board, to its right hand side (Fig. 6) so that current flows from the source to the conductor 9 through rectifier 53 which allows a positive current to pass to conductor 53' to energize the winding of electromagnet valve operator 46, and thence to ground via tubing 2 and the other blade of the switch 54. The number of times that switch 54 must be opened and closed is dependent upon the degree of opening required for valve 45. As shown in Fig. 12 sprocket 90 has 12 teeth so that electromagnet valve operator 46 must be actuated 6 times to effect a complete cycle. It is to be understood that sprocket 90 may have any number of teeth. For this particular cycle switch 54 will be opened or closed from 1 to 5 times. The result is that valve 45 (Fig. 4) will be opened and chamber 18 will be vented through passage 47, pipe 49, branch 50, open valve 45, passage 44 and passage 42. Note that pressure on both sides of electromagnet valve operator 46 are kept balanced at all times by pipe 49 and branch 50. Thus fluid will flow into the chamber and tail pipe 33 through valve 20 and seeks the fluid level of well. Whether this level is reached or not is dependent upon the height of opening 42 in relation to the pumping fluid level and the length of time that valve 45 is open.

After a suitable time interval, which is dependent upon the length of time believed necessary to fill chamber 18, switch 54 is again turned to the right to actuate electromagnet valve operator 46 the desired number of times to effect closing of valve 45. As soon as valve 45 is closed, switch 54 is thrown to its lefthand position. Fig. 6, allowing the flow of positive current down tubing 2 and thence through the windings of electromagnet valve operator 41, wire 51', rectifier 51 and thence to ground via conductor 9 and the other blade of switch 54. Although electromagnet valve operators 41 and 46 have the same common current conductors, the winding of electromagnet valve operator 46 remains de-energized because the rectifier 53 prevents current flow therethrough while the operating winding for electromagnet valve operator 41 is energized. Energization of the winding of electromagnet valve operator 41 causes valve 40 to open a small amount. Here again switch 54 must be opened and closed a number of times to de-energize and energize electromagnet valve operator 41 to effect turning of sprocket 90 and hence the full opening of valve 40. The opening of valve 40 allows the gas from the annulus between tubings 2 and 7, passages 30' and within housing 16 to pass through ports 41' of electromagnet valve operator 41 (see Fig. 3) and passages 39 and 37 into the chamber formed by casing 18 to force the fluid therein through the open end 34 of tube 33 and upwardly through the sealing member 27 and the tube 26 and from there through tube 23 into the macaroni tubing 7. This displacing gas is supplied from the surface through pipe 5 (see Fig. 1), choke 6 into the annular space between the regular tubing 2 and the macaroni tubing 7. It flows downwardly into cap 14 (Fig. 2) and thence through passageways 30' into the space within housing 16. The result is, as will be clear from Fig. 3, that it may thus reach the ports 41' as previously stated. Thus upon application of gas pressure to the chamber formed by housing 18 the fluid therein will be forced upwardly into the macaroni tubing 7 and thence into storage tanks (not shown). When it is believed that tubing 7 has been blown "dry," switch 54 is again turned to the left a required number of times to close valve 40. The purpose of check valve 8 is two-fold. First to prevent backflow of fluid due to slippage along the interior of tubing 7 and second to allow the use of flow collars (not shown) or additional valves as grouped in Fig. 7 to assist the flow of fluid within tubing 7 without interfering in the efficient refilling of chamber 4.

The location of tail pipe 33 as close to standing valve ball 20 as mentioned above will now become apparent. Since the well fluid contains sizeable quantities of sand, the sand will be deposited within chamber 4 and around ball 20. With tail pipe located as shown the turbulence of fluid and gas will effectively clean port 19 and ball 20 once each cycle. As soon as electromagnet valve operator 41 has been closed, valve 45 should again be opened by manipulating switch 54 and hence electromagnet valve operator 46 as described above so that chamber 4 can again be filled.

Since the partial weight of tubing 7 forces sealing member 27 downward and packing members 25 outward plus the fact that pressure differential helps to keep the members in sealing position, the packing members 25 and 32 prevent a short circuit between the fluid and gas paths of the pipes.

The operation of this form of the invention is clear from the above description and it will be particularly noted that the control of the device may be positively effected from the surface of the ground and as a part of this invention it is emphasized that this control is effected by a single conductor which extends to the surface. Although this operation will be clear in connection with later modifications, it will be noted that every time the valves 40 and 45 are closed the corresponding switches 52 and 56 will be momentarily closed, placing resistors 55 and 57 alternately in circuit around the windings of the associated magnet valves causing a momentary change in the current flow in the circuit which can be indicated at the control board 11 by means of a meter M diagrammatically illustrated in Figure 1. The fluttering movement of the hand of the meter will give a positive indication of the closing of the valves in response to the manipulation of switch 54 so that the operator will know that the manipulation of the switch has been effective to close the valves. He is thus informed that the down-hole equipment has been placed in proper position.

It is obvious that the manipulation of switch 54 may be done automatically by the use of conventional timing switches. This is particularly desirable in the case of pneumatic pumping as such cycles may only be a duration of minutes.

In Fig. 7 is diagrammatically illustrated an intermittent gas lift mechanism suitable for use in high fluid level wells in which the selective actuation of the electromechanical gas lift valves is positively effected from the surface. The well bore casing as before is shown at 1 sealed off at the top at 3 and provided with the gas injection line 5 which may be provided with suitable control devices, not shown, but like for example the adjustable choke 6 of the system of Figure 1 whereby the rate of gas injection can be controlled. A fluid flow line 7 extends upwardly through the casing to the surface and it is through this line that the well is produced with the assistance of the gas admitted through the gas lift mechanism of this invention. A packer 60 may be placed in the casing 1 at a suitable location with respect to and above the producing formation to seal off the lower section of the casing which is perforated, as indicated at 1' in the region of the producing formation. Whether a packer 60 is used is dependent upon bottom hole pressure. If the formation is capable of resisting the added force of the gas pressure and still allow a high rate of production, the packer 60 can be omitted and in many actual instances this packer is omitted. Mounted upon the tubing 7 are four electro-mechanical gas lift valves 61, 62, 63 and 64, the details of construction of which have been described in connection with Figs. 9 to 13 inclusive. Four valves are shown although it is to be understood that any number of valves less than or more than four may be used.

Valves 61 and 62 and valves 63 and 64 are each selectively operable by means of circuits including the single conductors 65 and 67 respectively in accordance with the principles of control illustrated diagrammatically in Fig. 6 and the object of the invention to use a single insulated conductor for each pair of valves. Cables 65 and 67 extend to the take-up reels 66 and 68 and from there to the control and indicating board 69 to which suitable operating current is supplied from a grounded source through the conductor 70. As will appear later, the other terminals of the operating windings of the valves 61 to 64 inclusive are connected to the tubing. As diagrammatically illustrated the tubing 7 is provided with a standing ball check valve 8 having the same function as the check valve 8 in the system of Fig. 1.

There is diagrammatically illustrated in Fig. 8 a circuit arrangement for effecting operation of four electro-mechanical gas lift valves such as those of the system of Fig. 7 through the use of one insulated conductor and the tubing as distinguished from the system of Fig. 7 where two conductors are employed. Thus a suitable power source is connected by the conductors 170 to diagonally opposite pairs of a double pole double throw switch 201, as diagrammatically illustrated in Fig. 8. A master switch 200 may be provided. One of the movable switch blades is connected by the conductor 165 to one terminal of each of the windings of four polarized relays P-1, P-2, P-3 and P-4, to one terminal of each of the electromagnet valve operator windings E-1, E-2, E-3 and E-4, and to one of the terminals of each of the voltage or potential relay windings V-1, V-2, V-3 and V-4. In this connection to each of the magnet valve operating windings E-1 to E-4 inclusive includes the normally open contacts P-1' to P-4' inclusive which form part of the polarized relays and are closed when the associated relay winding is operated. It is also to be noted that in the instance of valves 61 and 62 that the windings of both polarized relay P-1 and P-2 and magnet valve E-1 and E-2 include the normally closed contacts V-1' and V-2' which will be opened when the associated relay windings V-1 and V-2 are operated. In the case of valves 63 and 64 the normally open contacts V-3' and V-4' are included with the windings of the associated relay windings V-3 and V-4, and will be closed when the associated relay winding is actuated. The other terminals of each of the relay windings P-1 to P-4 inclusive and the valve operating windings E-1 to E-4 inclusive and the voltage relay windings V-1 to V-4 inclusive are connected to ground at 203 by means of the circuit connection 202 which diagrammatically represents the tubing. Each of the magnet valve windings E-1 to E-4 inclusive is shunted by a series circuit comprising the resistors R-1 to R-4 inclusive and the normally open contacts S-1 to S-4 inclusive, diagrammatically illustrated in Fig. 8. The contacts S-1 to S-4 inclusive correspond to the switch shown in Fig. 9 and operated by the valve stem and, of course, the resistances R-1 to R-4 inclusive correspond to the resistances 52 or 57 of Fig. 6.

Polarized relays 1 and 2 are designed to operate on a fixed potential but of different polarities and polarized relays 3 and 4 also operate on different polarities but at potentials higher than those required to operate relays 1 and 2. The magnet valve operating windings 1 and 2 are designed to operate on the same potential as polarized relays 1 and 2, and similarly magnet valve operating windings 3 and 4 operate on the same potential as polarized relays 3 and 4 or on a potential which is higher than that for which valve operating windings 1 and 2 are designed. Voltage relays 1 and 2 function to remove polarized relays 1 and 2 and magnet valve operating windings 1 and 2 from the circuit and thus render them inoperable when the voltage thereacross exceeds a predetermined amount in excess of their rated voltage. These voltage relays are designed to operate on a potential higher than the rated voltage for polarized relays 1 and 2, but less than the rated voltage for polarized relays 3 and 4. Voltage relays 3 and 4 close their contacts at some voltage slightly below the potential rating of polarized relays 3 and 4, thus permitting magnet valve operating windings 3 or 4 to operate depending upon the polarity of the circuit. All the voltage relays V-1 to V-4 inclusive are designed to operate faster than the polarized relays with which they are associated.

As a generalization let it first be assumed that magnet valve operating windings 1 and 2 and polarized relays 1 and 2 are designed to operate on X volts; assume magnet valve operating windings 3 and 4 as well as polarized relays 3 and 4 are designed to operate on 2X volts; voltage relays 1 and 2 would then open their contacts on 1.4X volts and voltage relays 3 and 4 would become operable on 1.9X volts.

A detailed description of the operation of this circuit will now be set out. Valve No. 61 controlled by the first set of relays is operated by throwing the switch blades of switch 201 downwardly so as to apply a positive potential of X volts to the ungrounded conductor 165. Switch 200 is, of course, closed. As a result polarized relay P-1 operates closing the contacts P-1' thereby energizing the valve operating winding E-1 as contacts V-1' remains closed. By opening and closing the master switch 200, valve No. 61 may be opened to any desired amount or closed without disturbing switch 201. As will be appreciated from the previous description each time valve No. 61 is closed contacts S-1 will close to give an indication at the control board that the valve has been closed. In order to operate valve No. 62 it is only necessary to throw the blades of switch 201 to their upward position rendering the conductor 165 negative. As a result polarized relay P-2 will be energized, closing contacts P-2' and thereby energizing the valve operating winding E-2 since contacts V-1' remains closed. By manipulation of master switch 200 valve No. 62 can be opened and closed. In both of these cases the other polarized relay will not operate as will be readily understood. In order to operate valve No. 63 the switch blades of switch 201 are thrown downwardly rendering the conductor 165 positive and the potential applied to the circuit is increased to 2X volts. When the master switch 200 is closed voltage relays V-1 and V-2 will be energized opening their contacts V-1' and V-2', thus rendering the polarized relays P-1 and P-2 inoperative. However, voltage relay V-3 will be energized closing its contact V-3', with the result that polarized relay P-3 will be operated closing its contact P-3'. The closing of contact P-3' will energize the magnet valve winding E-3 to operate the valve. Master switch 200 when opened and closed will cause the magnet valve to operate. Voltage relay V-4 will also be energized closing contacts V-4' but since P-4 will not be actuated by positive current from conductor 165 contacts P-4' will not be closed therefore magnet valve windings E-4 will not be energized. In order to operate valve 64, switch 201 is thrown to its upward position rendering conductor 165 negative. As a result voltage relay V-4 will operate, closing its contact V-4' and energizing polarized relay P-4 to close its contact P-4', whereupon magnet valve winding E-4 will operate. Likewise voltage V-3 will be energized closing contacts V-3' but since P-3 will not be actuated by negative current from conductor 165, P-3' will remain open and magnet valve winding E-3 will not operate.

Thus it will be seen that by the use of one insulated conductor and a ground connection preferably on the tubing it is possible to selectively actuate four down-hole valves such as for example the valve arrangement of Figure 7, and to provide an indication at the surface of the operation thereof. Thus the system of Figure 7 can be operated with only one cable supply reel and one conductor as distinguished from the double arrangement shown therein when the simpler circuit of Figure 6 is employed.

From the above description it will be apparent to those skilled in the art that the subject matter of this invention is capable of some variation in detail, and I do not, therefore, desire to be strictly limited to the illustrative

What is claimed is:

1. In a gas pumping system for flowing an oil well, the combination including a tubing string extending into the well, a conduit extending into the well for supplying pumping gas to said tubing string, a plurality of electromagnetic valves for inter-connecting the tubing string to said conduit at selected points vertically in the well for controlling the flow of pumping gas to the tubing string, an operating winding for each valve, circuits for each winding comprising a single insulated conductor and a grounded return, and means in said circuit for selectively energizing any one of said windings independently including control means at the surface.

2. In the combination of claim 1, two valve windings and unidirectional current conductors in the circuits of said windings respectively to effect said selective energization thereof.

3. In the combination of claim 1, means energized upon operation of each of said valves for indicating at the surface the positions of said valves with respect to their seats.

4. In the combination of claim 1, means energized upon operation of each of said valves for indicating at the surface their positions with respect to their seats, comprising a switch operated by the closing of said valves for controlling said circuit to vary the resistance thereof.

5. In a gas lift system for producing an oil well, wherein a tubing string passes to a point below the liquid level of the well, the improvement comprising a conduit for supplying pumping gas substantially to the lower end of the tubing string, means in said well in communication with said tubing string comprising a housing forming a chamber having a port therein, a check valve for said port, a pair of electro-mechanical valves for controlling the supply and exhaust of said pumping gas from said conduit to and from said chamber, and electrical circuit means including control means at the surface for selectively effecting actuation of said valves, whereby pumping gas may be alternately supplied to and exhausted from said chamber to effect intermittent flow of fluid from said chamber to said string.

6. In the combination of claim 5, said means at the surface including a grounded control device connected by a single insulated conductor to said electro-mechanical valves from the surface.

7. In the combination of claim 5, said means at the surface including a grounded control device connected by a single insulated conductor extending to said electro-mechanical valves from the surface, and a pair of unidirectional current conductors for effecting selective actuation of said valves said insulated conductor and ground providing connections to said unidirectional current conductors.

8. In a gas pumping system for flowing an oil well the combination comprising means forming a down-hole displacement chamber, a conduit extending from said chamber means to the surface for supplying pumping gas thereto, a tubing string extending from said chamber means to the surface including a check valve, valve means in said chamber for alternatively supplying pumping gas from said conduit to said chamber and exhausting it from said chamber whereby fluid may be forced through said tubing intermittently and circuits including said means at the surface for controlling said valve means to vary the rate of gas supply to said chamber means.

9. A gas lift pumping system in an oil well comprising a tubing string having a check valve therein, a conduit for supplying pumping gas to said tubing string, a plurality of electromechanically operated valves for establishing connections from said conduit to said tubing string, and means at the surface for selectively and independently controlling said valves including a single insulated conductor and a ground return interconnecting said means and valves.

10. A gas lift pumping system in an oil well comprising a tubing string having a check valve therein, a conduit for supplying pumping gas to said tubing string, a plurality of electromechanically operated valves for interconnecting said conduit to said tubing string, means at the surface for selectively controlling said valves including a single insulated conductor and a ground return connected to said electro-mechanically operated valves, and means actuated by said valves for indicating the fact of valve closure at the surface.

11. A gas lift pumping system in an oil well comprising a tubing string having a check valve therein, a conduit for supplying pumping gas to said tubing string, four valves and tubing means interconnecting said conduit and tubing string for admitting pumping gas from said conduit to said string, separate electromagnets for operating said valves, and means for selectively and independently energizing said electromagnets comprising a single insulated conductor extending to the surface from said windings and a ground return for all of said windings.

12. A gas lift pumping system for an oil well comprising a tubing string having a check valve therein, a conduit for supplying pumping gas to said tubing string, four valves for interconnecting said conduit to said string at longitudinally spaced points, separate electromagnets having windings for operating said valves, a circuit for selectively energizing said electromagnets comprising a single insulated conductor extending to the surface from the windings of said electromagnets and a ground return for all of the windings, a polarized relay and a voltage relay associated with each of the windings, the voltage relays associated with two of the windings being energized upon the application of the proper potential thereto to render the associated polarized relays inoperative, and the other two of said voltage relays upon energization at the same potential rendering the associated polarized relays operative, and means for changing the polarity of said circuit.

13. In the combination of claim 12, means in said circuit for indicating all positions of said valves.

14. In a gas lift apparatus for flowing an oil well, a circuit combination comprising a conductor, a pair of oppositely poled polarized relays having one side of each connected to said conductor, a pair of operating windings each having one side connected to said conductor through normally open contacts of the associated polarized relays, a pair of voltage relays each having one side of their operating windings connected to said conductor, a second conductor connected to the other side of each of said voltage relay windings, the other side of each of said polarized relays, and the other side of each of said operating windings being connected to said second conductor through the normally closed contacts of said voltage relays respectively, and means for alternately oppositely polarizing said conductors whereby said operating windings are selectively energized, said voltage relays operating on a higher voltage and faster than the polarized relays.

15. In the combination of claim 14, two additional oppositely poled polarized relays each having one side connected to said first conductor and operating at a potential higher than said first pair of polarized relays, two additional voltage relays each having one side of their operating windings connected to said first conductor and operable at a higher potential and faster than said additional polarized relays, two additional operating windings each having one side connected to said first conductor through the normally open contacts of said two additional polarized relays, the other side of each of said two additional voltage relays and the other side of each of said two additional operating windings being connected to the second of said conductors and the other side of each of the two additional polarized relays being also connected to said second conductor but through the normally open contacts of said two additional voltage relays, whereby alternative opposite polarization at a higher potential of said conductors than applied to operate said first pair of windings, said first two polarized relays are rendered inoperative and said two additional polarized relays may be selectively energized so that all four of said operating windings may be selectively energized.

16. In a control system for a gas lift for flowing an oil well, the combination comprising a pair of conductors, four operating windings connectable to said conductors, a pair of polarized relays normally connected to said conductors for respectively connecting said windings to said conductors, a second pair of polarized relays connectable to said conductors and operating at a higher potential than said first pair, a pair of voltage relays energized upon application of a higher potential than the operating potential of said second pair of polarized relays to connect the latter to said conductors and in turn connect said second pair of operating windings to said conductors, and an additional pair of voltage relays and operating faster and at a higher potential than said first pair of polarized relays for disconnecting the latter from said conductors upon application of said proper potential to said conductors whereby each of said operating windings may be selectively energized.

17. A gas displacement pump for flowing an oil well comprising a downhole housing forming two chambers, the first of which is adapted to have gas under pressure supplied thereto and the other of which has a check valved port for passing a liquid thereinto, a conduit having a check valve therein extending from said second chamber, a downhole magnet valve for connecting said first chamber to said second chamber, a second downhole magnet valve for connecting said second chamber to the exterior of said housing and means at the surface having circuit connections to said magnet valves for selectively controlling said magnet valves.

18. The combination of claim 17, said circuit connections including a single insulated conductor and a ground return.

References Cited in the file of this patent

UNITED STATES PATENTS

| Number | Name | Date |
|---|---|---|
| 1,384,443 | Frey | July 12, 1921 |
| 1,426,718 | Florez | Aug. 22, 1922 |
| 1,672,005 | Sorensen | June 5, 1928 |
| 1,704,736 | Geiger | Mar. 12, 1929 |
| 1,787,550 | Sorensen | Jan. 6, 1931 |
| 2,145,402 | Miller | Jan. 31, 1939 |
| 2,270,434 | Gould | Jan. 20, 1942 |
| 2,278,532 | Crickmer | Apr. 7, 1942 |
| 2,293,809 | Dodd | Aug. 25, 1942 |
| 2,307,171 | Tutton | Jan. 5, 1943 |
| 2,337,651 | Douglass | Dec. 28, 1943 |
| 2,340,070 | McCauley | Jan. 25, 1944 |
| 2,412,723 | Elliott | Dec. 17, 1946 |